April 21, 1959 N. A. NELSON ET AL 2,882,813
PLUNGER SAFETY STOP FOR BALERS
Filed April 26, 1955 2 Sheets-Sheet 1

INVENTORS.
NORAL A. NELSON
WILLIAM A. WATHEN &
HOWARD G. THOMPSON
BY Carlson, Pitzner, Hubbard & Wolfe
ATTORNEYS.

April 21, 1959  N. A. NELSON ET AL  2,882,813
PLUNGER SAFETY STOP FOR BALERS
Filed April 26, 1955  2 Sheets-Sheet 2
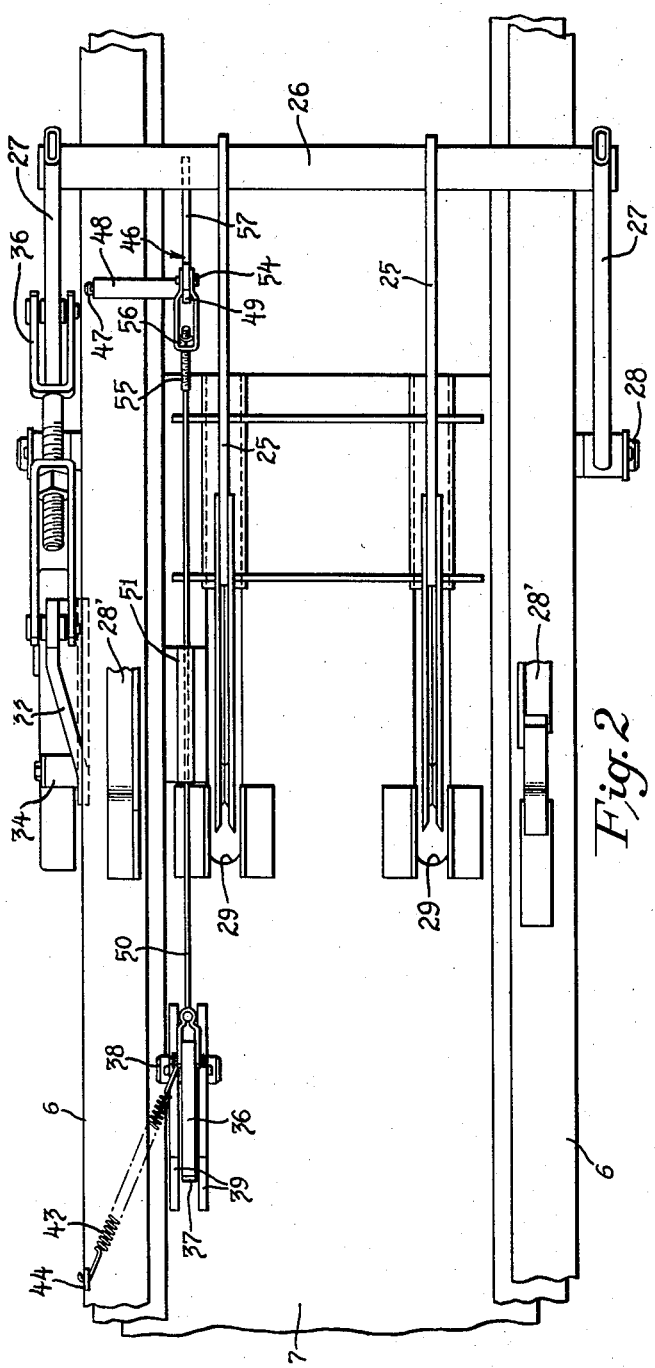
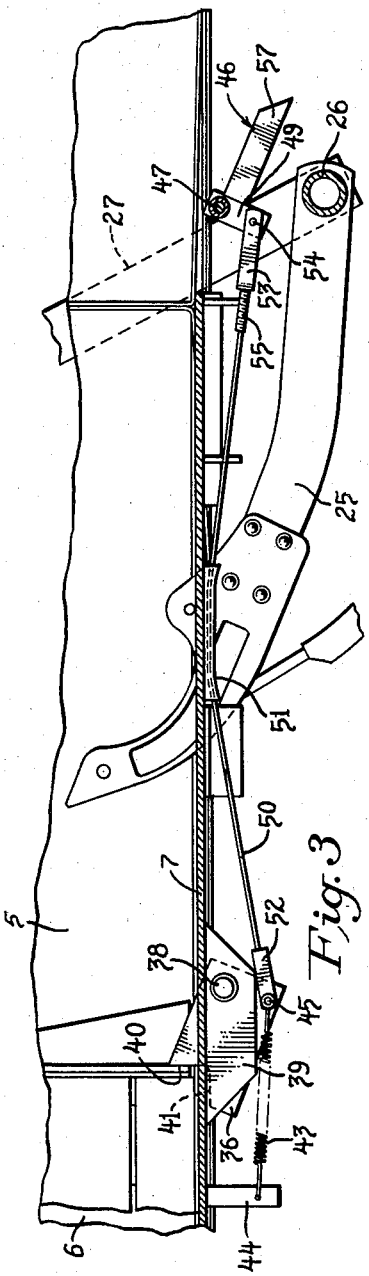
INVENTORS.
NORAL A. NELSON
WILLIAM A. WATHEN &
HOWARD G. THOMPSON
BY
Carlson, Pitzner, Hubbard & Wolfe
ATTORNEYS.

2,882,813

PLUNGER SAFETY STOP FOR BALERS

Noral A. Nelson, Holland, and William A. Wathen and Howard G. Thompson, Detroit, Mich., assignors to Massey-Ferguson, Inc., a corporation of Maryland Application April 26, 1955, Serial No. 504,084

3 Claims. (Cl. 100—19)

The invention relates to plunger type balers equipped with automatic bale-tying mechanism and more particularly to improved safety means for preventing the plunger from damaging the needles of the tying mechanism in the event of interference with the normal movements of the needles.

One object of the invention is to provide safety stop means operative to positively block entry of the plunger into the baling chamber until the needles have been withdrawn therefrom following a tying operation, which means is simple and rugged in construction and which is reliable in operation due to its freedom from interference by the other elements of the baler or the material handled thereby.

Another object is to provide a plunger safety stop for balers embodying improved means for shifting it between operated and retracted positions which imposes no substantial load on the needle actuating mechanism and which provides complete protection for the needles from the time they initially enter the baling chamber until they are completely withdrawn therefrom.

Other objects and advantages of the invention will become apparent from the following detailed description of the preferred embodiment illustrated in the accompanying drawings, in which—

Fig. 2 is a bottom view of the structure shown in Figure 1.

Fig. 3 is a fragmentary sectional view taken in the same plane as Figure 1 but showing the needles advanced into the baling chamber and the stop means in operated position.

Figure 1:
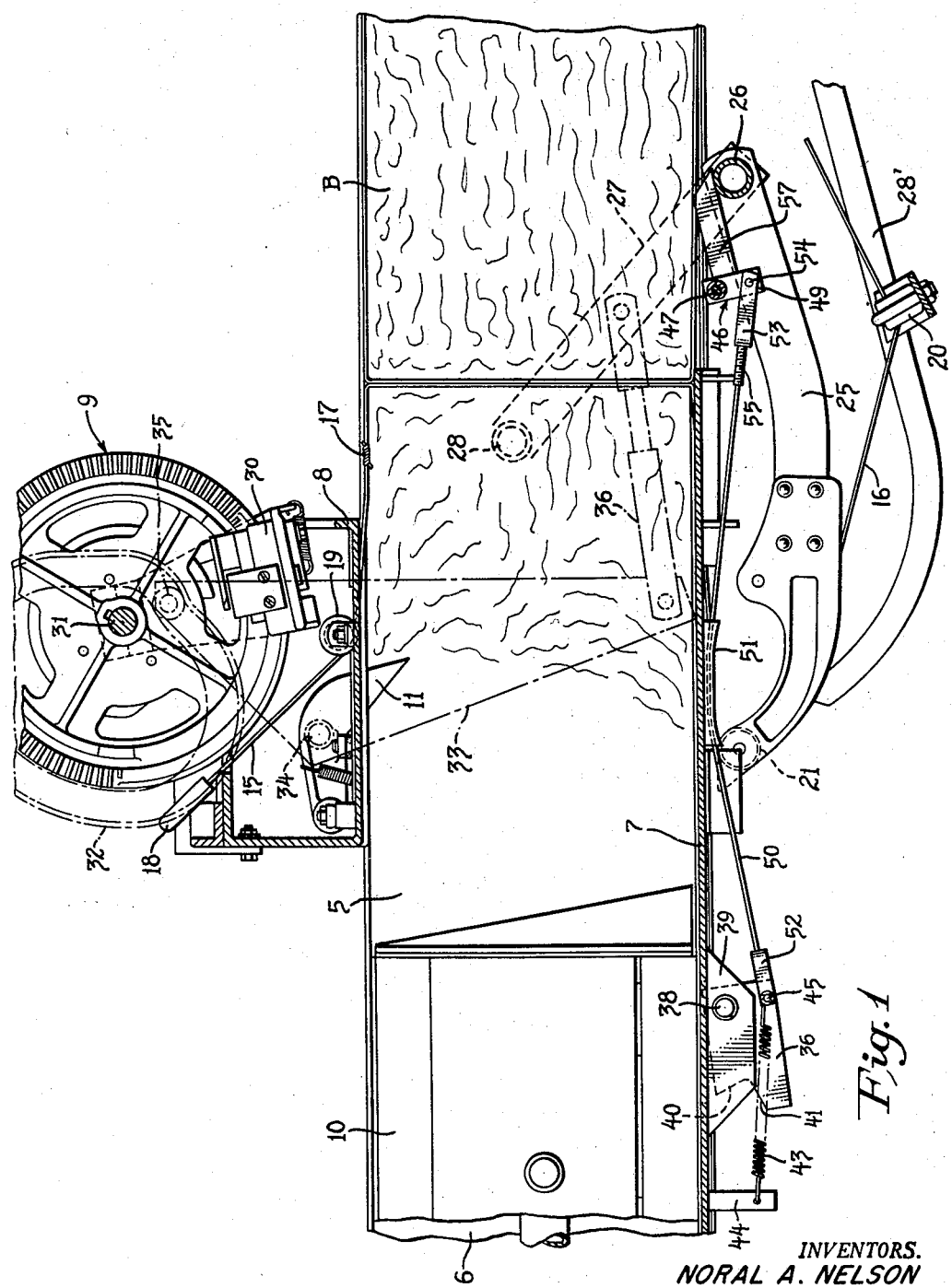
Figure 1 is a fragmentary longitudinal sectional view through the baling chamber of a baler equipped with safety stop means embodying the features of the invention, the stop means being shown in retracted position.

While the preferred form of the invention has been shown, it is to be understood that there is no intention to limit the invention to the particular form illustrated, but, on the contrary, the intention is to cover all modifications and adaptations falling within the spirit and scope of the invention as expressed in the appended claims.

For purposes of illustration the invention has been shown as incorporated in a baler of the type disclosed and claimed in the co-pending application of Noral A. Nelson, Serial No. 504,080, filed April 26, 1955. As shown in the drawings, the baler has a baling chamber 5 of rectangular cross-section defined by spaced parallel sidewall members 6 and a flat bottom member 7. A frame structure 8 (Fig. 1) carrying a part of the bale tying mechanism indicated generally at 9, extends over and partially closes the top of the baling chamber. During the formation of a bale, the rear end wall of the baling chamber is defined by the previously formed bale B which is gradually pushed rearwardly in the chamber as the new bale is built up.

Hay or other material to be baled is fed in batches into the baling chamber through an opening in one of the side wall members 6 and successive batches are compressed into a bale by a plunger 10 reciprocating longitudinally of the baling chamber. A holding dog 11 pivoted above the baling chamber, in this instance on the frame 8, retains the hay in tightly packed condition when the plunger is retracted. When the bale reaches a predetermined size, a metering device (not shown) initiates the operation of the bale-tying mechanism in well known manner which, in the interval between the retreat of the plunger 10 and the next advance, securely ties the bale with strands of twine or wire wrapped endwise around the bale.

In the exemplary baler two strands are wrapped around each bale. When wire tying mechanism is provided, each of the strands comprises two wires 15 and 16 having their ends twisted together as at 17 to form a continuous strand. One of the wires, in this instance the wire 15, is led through the top of the baling chamber by way of a guide 18 and guide roller 19. The other wire 16 is led in through the bottom of the baling chamber by way of a guide 20 and a roller 21 so that when the wires are united by the twisted joint 17, they provide a continuous vertical run across the baling chamber. Accordingly, as a bale is formed, the wires are pushed back forming a loop about the bale, extending around one end and along the top and bottom of the bale, as shown in Fig. 1.

To provide for carrying the lower run of the wire loop through the baling chamber and alongside the upper run for joining the two wires, the roller 21 is carried on a needle 25 which is normally disposed below the baling chamber and is adapted to be projected upwardly therethrough. Two of the needles 25 are provided in a needle assembly, each needle being welded or otherwise rigidly secured at one end to a cross shaft 26 extending transversely below the baling chamber. The shaft 26 is supported at opposite ends on the lower ends of a pair of depending arms 27 respectively pivoted at their upper ends as at 28 on the side wall member 6 of the baling chamber to swing fore-and-aft of the chamber. The arrangement is such that when the needle assembly is swung to the fully retracted position in which it is shown in Figure 1, the needles 25 are disposed below and substantially parallel to the bottom of the baling chamber. Suitable guards 28' are provided to protect the needles.

As the needle assembly is swung forwardly, the needles 25 pass through suitable openings 29 (Fig. 2) in the bottom 7 of the baling chamber and then upwardly to lay the wire 16 alongside the wire 15 and present both to the twisting unit 30, comprising a part of the tying mechanism. This unit operates in well known manner to twist the two wires together and sever the twisted section at an intermediate point to unite the wires wrapped around the bale and to form the twisted joint 17 joining the wires in a continuous strand for the next bale.

Upon substantial completion of the twisting operation, the needles are again withdrawn to retracted position. Such withdrawal as well as the needle advance and the tying operations are timed and coordinated with the movements of the baling plunger 10 by means of a cyclically rotated shaft 31 released for rotation by the metering device. This shaft carries suitable gears for actuating the wire twisting units 30 and additionally carries a cam 32 for swinging the needle assembly between retracted and operated positions. Such swinging is effected through a lever 33 pivoted as at 34 on the frame 8 and having at its upper end a follower roller 35 coacting with a grooved track in one face of the cam. At its one end the lever is connected by an adjustable pitman 36 with one of the arms 27 of the needle assembly.

The cycle of the tying mechanism is such that under normal operating conditions there is ample time for the needle assembly to execute its operating and return strokes. However, provision is made for interrupting the advance of the baling plunger 10 before it can damage the needles in case anything prevents or substantially delays the return movement of the needle assembly. In the present instance such interruption is effected by interposing positive stop means in the path of the plunger while the needle assembly is away from its retracted position. When the plunger advance is interrupted by the stop means, the plunger drive is temporarily discontinued by shearing of a safety bolt interposed in the drive in the conventional manner.

Preferably the stop means comprises a dog 36 supported adjacent the forward end of the baling chamber for movement into and out of the path of the plunger 10. As herein shown, the dog 36 is in the form of a generally rectangular metal plate supported below the baling chamber in alignment with an elongated slot 37 (Fig. 2) in the chamber bottom member 7. Support for the dog is provided, in this instance, by a pivot pin 38 journaled in alined apertures in a pair of supported plates 39 depending from and welded or otherwise rigidly attached to the bottom member 7 at opposite sides of the slot 37. As will be seen by reference to Figs. 1 and 2 of the drawings, the pivotal axis of the dog is located so that it may be rocked into an inactive position (Fig. 1) in which it is completely withdrawn from the baling chamber so that it cannot interfere in any way with the reciprocation of the baling plunger. Alternatively, the dog may be rocked to project its forward end into the baling chamber and present an abutment in the path of the plunger. Preferably, the forward edge of the dog is notched to define a plunger engaging edge or abutment 40 that is generally parallel to the face of the plunger when the dog is in the operated or plunger blocking position. The notching also provides a stop surface 41 adapted to abut the bottom member 7 and define one limit position of the dog.

In accordance with the invention, means is provided for actuating the stop 36 in response to the swinging of the needle assembly to and from retracted position, which not only imposes no load on the needle swinging mechanism but actually aids that mechanism in starting the needles in motion. To that end, the dog 36 is biased to a plunger blocking position, in this instance, by a tension spring 43 connected at one end to a bracket 44 rigid with and depending from one side wall member of the baling chamber. The other end of the spring 43 is connected to the dog by a cross-pin 45, the connection being below the pivot pin 38 and spaced substantially therefrom.

The actuating means for the stop dog in its preferred form comprises a rocker member or bell crank lever 46 pivotally supported to swing about an axis generally parallel to the pivotal axis of the dog. In the exemplary embodiment support for the rocker 46 is provided by a pin 47 having one end rigidly fixed to the rocker. The pin 47 is rotatably received in a tubular socket 48 welded or otherwise rigidly secured to one of the members defining the baling chamber, in this instance, an inturned portion of one of the side wall members 6. As stated heretofore, the rocker member 46 is in the form of a bell crank having one arm 49 connected by a tension link 50 with the stop dog 36. Preferably, the link comprises a flexible cable or the like and, in the present instance, is threaded through a tubular guide 51 attached to the underside of the baling chamber. Connection with the dog 36 is made through a clevis 52 anchored to one end of the link and apertured to receive the pin 45. A similar clevis 53 anchored to the other end of the link straddles the arm 49 of the rocker member and is pivotally connected thereto by a pin 54. To provide for adjusting the effective length of the link, the clevis 53 is apertured to receive a terminal element 55 suitably attached to the cable portion of the link and having its end portion threaded for the reception of a retaining nut 56 (Fig. 2).

For cooperation with the needle assembly, the rocker member 46 is located adjacent the end of the baling chamber remote from the dog 36 with its other arm 57 positioned for engagement by some part of the needle assembly as the latter swings into retracted position. In the particular embodiment illustrated, the bell crank is mounted in a position such that the cross-bar 26 of the needle assembly engages the arm 57 and swings the rocker member to the position shown in Fig. 1 when the needle assembly is fully retracted. The link 50 is adjusted, of course, so that the stop dog 36 is swung to its inactive position or out of the path of the plunger 10 under such conditions. When the needle assembly is swung away from the retracted position, the spring 43 swings the dog 36 into the plunger blocking position in which it is shown in Fig. 3. Rocker member 46 follows the movements of the dog, or in other words, is swung to the cocked position by means of the link 50.

It will be apparent from the foregoing that the invention provides an effective plunger stop which is very rugged and positive in its action. The actuating mechanism for the stop is simple and dependable. A particular advantage of this mechanism is that it requires no direct connection with the needle assembly and imposes no load on the drive mechanism which swings the needle assembly to the operated position. The improved mechanism in fact assists the needles' swinging mechanism in starting the needles in motion since the spring 43 imposes a bias on the assembly when it is in retracted position. Quick and easy starting of the needle assembly materially helps to insure full advance and retraction of the needles in the interval between plunger reciprocations.

We claim as our invention:

1. In a baler having a baling chamber with a plunger reciprocating therein and bale tying mechanism including a needle assembly swingable between retracted and operated positions to carry a tying strand through the baling chamber ahead of the plunger, the combination of safety means for preventing advance of the plunger when the needle assembly is away from retracted position comprising, a dog pivotally supported adjacent the forward end of the baling chamber to swing into and out of the path of the plunger, spring means yieldably urging said dog into the path of the plunger, means secured to the baling chamber defining a socket adjacent the other end of the chamber, a bell crank lever pivotally supported in said socket and having one arm positioned for engagement by the needle assembly as it swings into retracted position, and a tension link connecting the other arm of said lever with said dog so as to swing it out of the path of the plunger upon engagement of the needle assembly with said lever arm.

2. In a baler having a baling chamber with a plunger reciprocating therein and bale tying mechanism including a needle assembly swingable between retracted and operated positions to carry a tying strand through the baling chamber ahead of the plunger, the combination of safety means for preventing advance of the plunger when the needle assembly is away from retracted position comprising, a stop dog supported adjacent the forward end of the baling chamber for movement into and out of the path of the plunger, spring means yieldably urging said dog into the path of the plunger, means secured to the baling chamber defining a socket adjacent the other end of the chamber, a rocker member pivotally supported in said socket and having an arm positioned for engagement by the needle assembly as the assembly swings into retracted position, and a tension link connecting said rocker member with said dog operative to withdraw the dog from the path of the plunger incident to the engagement of said arm by the needle assembly.

3. In a baler having a baling chamber with a plunger reciprocating therein and bale tying mechanism including a pair of needles carried by a cross bar and swingable as a unit between retracted and operated positions to carry a tying strand through the baling chamber ahead of the plunger, the combination of safety means for preventing advance of the plunger when the needle assembly is away from retracted position comprising, a stop dog biased to a position to positively block the movement of the plunger into the baling chamber, and means including a member pivotally supported below the baling chamber adjacent the end remote from the plunger and having a member positioned for engagement by the needle carrying cross bar only while approaching and in the retracted position for withdrawing said dog from plunger blocking position.

References Cited in the file of this patent

UNITED STATES PATENTS

| | | |
|---|---|---|
| 2,622,507 | Hitchcock | Dec. 23, 1952 |
| 2,735,359 | Tarbox | Feb. 21, 1956 |